Jan. 20, 1959  A. A. WIDMANN  2,869,607
HOLLOW-ADJUSTING SCREW HAVING RADIALLY
PROJECTING THREAD LOCKING PORTIONS
Filed Feb. 14, 1956  2 Sheets-Sheet 2
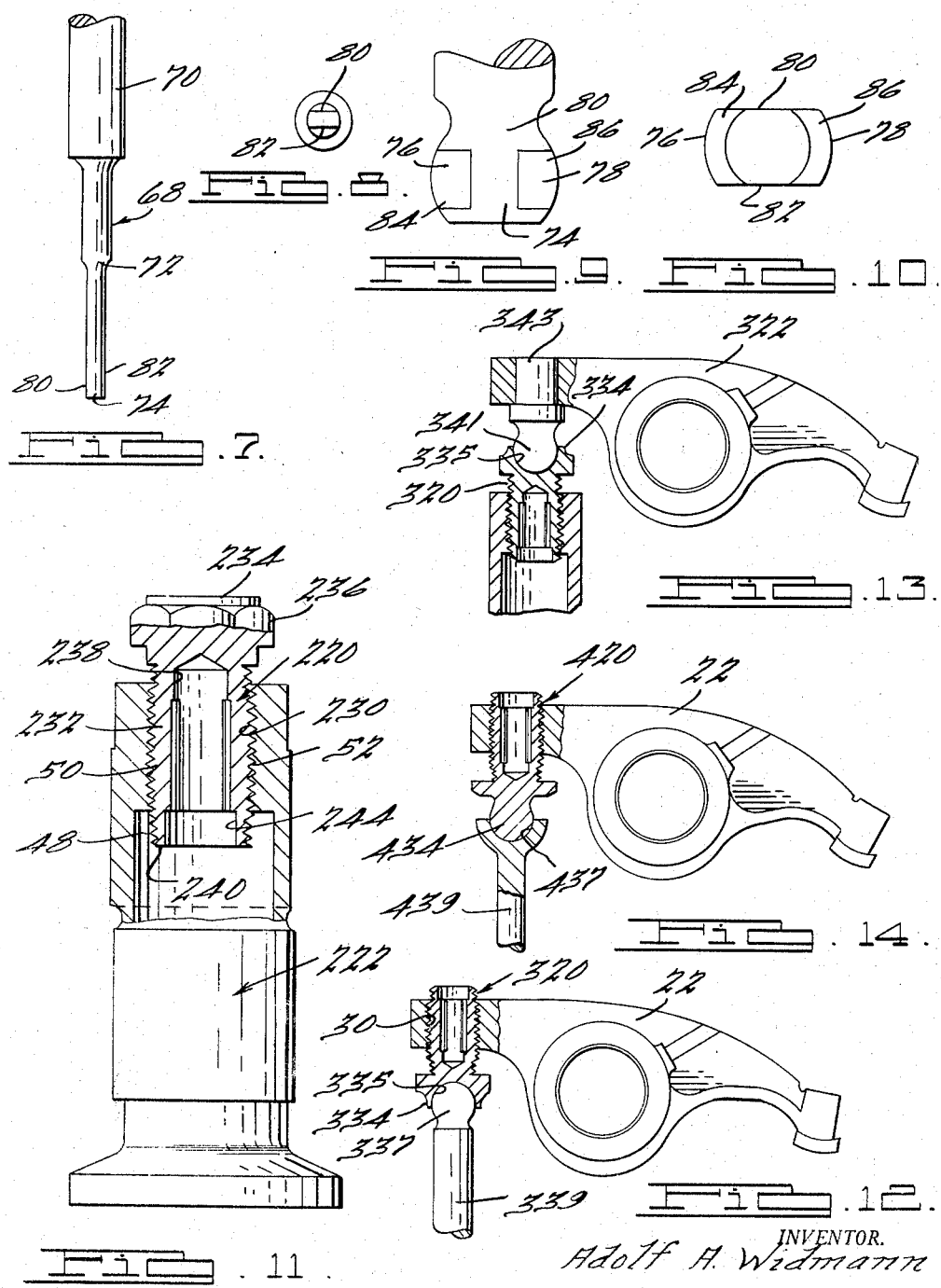
INVENTOR.
Adolf A. Widmann
BY
Harness, Dickey & Pierce
ATTORNEYS

United States Patent Office 2,869,607
Patented Jan. 20, 1959

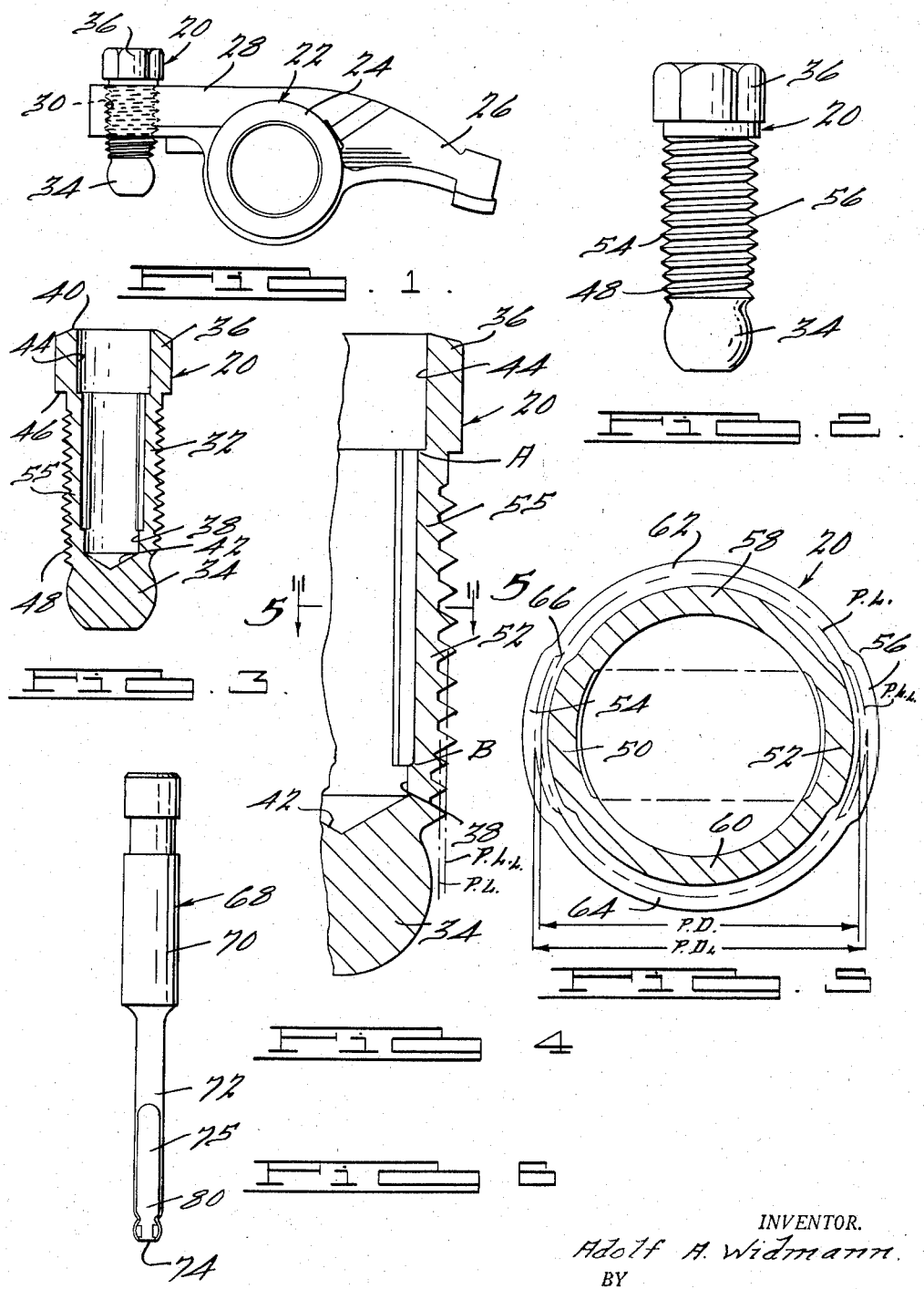

2,869,607

HOLLOW-ADJUSTING SCREW HAVING RADIALLY PROJECTING THREAD LOCKING PORTIONS

Adolf A. Widmann, Grosse Pointe Farms, Mich., assignor to National Machine Products Company, Utica, Mich., a corporation of Michigan Application February 14, 1956, Serial No. 565,392

2 Claims. (Cl. 151—14)

This invention relates to valve lash adjusting screws and, more particularly, to an improved self-locking prevailing torque-type valve lash adjusting screw particularly adapted for use in the valve actuating assemblies of internal combustion engines.

Heretofore, the valve lash adjusting screws most commonly used in the valve actuating assemblies of internal combustion engines have been of the non-locking type and have had a free fit with the internal threads provided on the rocker arm, tappet body or push rod, such prior screws having been maintained in the proper position by means of a lock or check nut. However, such prior structures have been subject to the defect that it has been difficult to make the desired clearance adjustments at the time the engine is assembled, as well as when making service adjustments, because, in addition to a feeler gauge for checking the clearance, the prior structure inherently required the use of two driving tools, namley, a tool for driving the screw and a tool for driving the check nut. Such an adjustment procedure is inherently awkward, laborious and time-consuming since the mechanic cannot manipulate the two driving tools and the feeler gauge at the same time during the valve lash adjusting operation.

Heretofore, a self-locking setscrew has been proposed in which a thin-walled relatively flexible counterbored section at one end of the screw has been deformed so that when the screw is viewed in longitudinal cross section, the pitch line of the thread on the locking portion of the screw defines a cone, and when the screw is viewed in transverse cross section, the pitch line of the thread on the locking portion defines an elliptical or other smooth non-circular curve. Because of the elliptical or non-circular curvature of the pitch line, these last-mentioned setscrews have been subject to the defect that the thread in the locking portion makes substantially point contact rather than area contact with the mating internal thread associated therewith. Furthermore, because of the conical disposition of the pitch line of the thread on the locking portion of such prior setscrews, substantially only one convolution of the thread of the locking portion engages the mating internal thread with sufficient force to effect any locking action. Consequently, such prior setscrews do not have sufficient locking action to withstand the relatively large forces to which a valve lash adjusting screw is subjected.

An object of the present invention is to overcome disadvantages inherent in prior non-locking valve lash adjusting screws and in self-locking setscrews of the indicated character and to provide an improved prevailing torque-type valve lash adjusting screw incorporating improved means for locking the screw in a mating internally threaded aperture in a rocker arm, tappet body, push rod or the like Another object of the invention is to provide an improved valve lash adjusting screw which obviates the necessity of utilizing more than one driving tool when the screw is adjusted for clearance purposes, thereby enabling the mechanic to use a feeler gauge simultaneoulsy with the driving means.

Another object of the invention is to provide an improved valve lash adjusting screw which obviates the necessity of providing a lock or check nut in the valve actuating assembly, thereby reducing the cost of the assembly and the time and labor required to effect the assembly of the various components.

Another object of the invention is to reduce the weight of the valve actuating means by eliminating the check nut and providing a lighter adjustment screw, thereby reducing the mass of the reciprocating components and enabling the use of a lighter valve spring.

Another object of the invention is to provide an improved adjusting screw which may be incorporated in a conventional rocker arm, tappet body or push rod without necessitating the modification of the structure of the rocker arm, tappet body or push rod.

Still another object of the present invention is to provide an improved prevailing torque-type valve lash adjusting screw that is economical to manufacture, durable, efficient and reliable in operation.

The above as well as other objects and advantages of the present invention will become apparent from the following description, the appended claims and the accompanying drawings wherein:

Figure 1 is an elevational view of a valve lash adjusting screw embodying the present invention, showing the same in installed relationship with respect to a rocker arm;

Fig. 2 is an enlarged elevational view of the screw illustrated in Figure 1, showing the same removed from the rocker arm;

Fig. 3 is a longitudinal sectional view of the screw illustrated in Fig. 2;

Fig. 4 is an enlarged longitudinal sectional view of a portion of the structure illustrated in Fig. 3;

Fig. 5 is an enlarged transverse sectional view of the screw illustrated in Fig. 4, taken on the line 5—5 thereof;

Fig. 6 is a side elevational view of an extrusion tool which may be used in manufacturing the screw illustrated in Figs. 1–5;

Fig. 7 is an end elevational view of the tool illustrated in Fig. 6;

Fig. 8 is an end view of the tool illustrated in Fig. 6;

Fig. 9 is an enlarged side elevational view of the head portion of the tool illustrated in Fig. 6;

Fig. 10 is an enlarged end view of the head portion of the tool illustrated in Fig. 8;

Fig. 11 is an elevational view, with portions in section, of another embodiment of the invention, showing the same in installed relationship with respect to a tappet body;

Fig. 12 is an elevational view, with portions in section, of another embodiment of the invention, showing the same in installed relationship with respect to a rocker arm and a push rod;

Fig. 13 is an elevational view, with portions in section, of the embodiment of the invention illustrated in Fig. 12, showing the same in installed relationship with respect to another rocker arm and a push rod; and Fig. 14 is an elevational view, with portions in section, of yet another embodiment of the invention, showing the same in installed relationship with respect to a rocker arm and push rod.

Referring to the drawings and, more particularly, to Figs. 1–5 thereof, the present invention is shown embodied in a self-locking prevailing torque-type valve lash adjusting screw, generally designated 20, which is particularly adapted for use with a rocker arm 22 of an internal combustion engine, although it will be understood that the present invention is applicable to other uses.

The rocker arm includes a body portion 24 which is adapted to be mounted for reciprocating movement on a rock shaft (not shown) of a conventional internal combustion engine, and a pair of arm portions 26 and 28 are provided which project outwardly from the body portion 24 on opposite sides of the axis of reciprocation. The arm portion 26 is adapted to bear against the valve stem of an internal combustion engine valve while the arm portion 28 defines an internally threaded aperture 30 which is adapted to receive the valve lash adjusting screw 20.

The screw 20 includes a body portion 32 which is preferably made from suitable steel stock, preferably steel which is low in sulphur and manganese content. It has been found, for example, that steel manufactured according to AISI–C–1017 or C–1020, both of which are low in sulphur and manganese content, are eminently satisfactory. A ball-end bearing portion 34 is provided on one end of the body portion 32, the ball-end portion 34 being integral with the body portion 32 and the maximum transverse dimension of the ball-end portion being less than the root diameter of the body portion. The ball-end portion 34 is adapted to bear against a push rod or other valve actuating member. An integral, enlarged non-circular head portion 36 is provided on the end of the body portion 32 remote from the ball-end portion 34, the maximum transverse dimension of the head portion 36 being substantially greater than the maximum transverse dimension of the body portion 32.

The screw 20 defines an axially extending bore 38 which is closed at one end and which extends from the end 40 of the screw through the head portion 36 and the body portion 32 to a position adjacent the ball-end portion 34 thereof, the bottom wall 42 of the bore 38 being adjacent the inner end of the ball-end portion 34, as shown in Figures 3 and 4. The bore 38 is enlarged, as at 44, from the end 40 of the screw to a position adjacent the axially inner end 46 of the head portion 36 of the screw.

A conventional external thread 48 is initially provided on the body portion 32, the thread 48 extending continuously from a position adjacent the ball-end portion 34 of the screw to a position adjacent the head portion 36 thereof. The thread 48 may be formed in any desired or conventional manner, as, for example, by conventional thread rolling methods.

In the embodiment of the invention illustrated in Figs. 1–5, a pair of thread locking lobe portions 50 and 52 are extruded from the wall 55 of the body portion 32 of the screw on diametrically opposite sides of the longitudinal axis of the screw. The locking lobe portions 50 and 52 and the sections 54 and 56 of the thread 48 formed thereon project abruptly outwardly from the wall 54 of the body portion in a radial direction while the remaining portions 58 and 60 of the wall 54 between the locking lobe portions 50 and 52, and the sections 62 and 64 of the thread 48 formed on the body portion 32 between the locking lobe portions 50 and 52 are substantially undistorted. The locking lobe portions 50 and 52 extend axially of the body portion 32 from a position adjacent the inner end 46 of the head portion 36 of the screw to a position near, but spaced from, the ball-end portion 34 of the screw. It is preferred that the two or three leading convolutions of the thread 48 adjacent the ball-end portion 34 retain the original pitch diameter so that such leading convolutions will easily enter the internally threaded aperture 30 in the rocker arm 22.

As shown in Figs. 2, 3 and 4, the locking lobe portions 50 and 52 of the screw in the embodiment of the invention illustrated, extend longitudinally of the body portion of the screw for substantially the entire length thereof, as, for example, from the point A to the point B, thereby affording a wide range of self-locking adjustment positions of the screw relative to the rocker arm. As shown in Fig. 5, the pitch diameter P.D.$_L$ of the sections 54 and 56 of the thread 48 on the locking lobe portions 50 and 52 is greater than the pitch diameter P.D. of the remaining sections 62 and 64 of the originally rolled thread between the locking lobe portions 50 and 52. Furthermore, the pitch diameter of the sections 54 and 56 of the thread 48 on the locking lobe portions 50 and 52 is uniform throughout the length of the locking lobe portions, as shown in Figs. 2, 3 and 4, and, as shown in Fig. 5, the pitch line P.L.$_L$ of the sections of the thread on the locking lobe portions defines a segment of a right circular cylinder which is concentric with respect to and greater in diameter than the cylinder defined by the pitch line P.L. of the initially rolled thread. It will be understood, of course, that the pitch diameter of the sections of the thread 48 on the locking lobe portions and the pitch diameter of the undistorted sections 62 and 64 changes abruptly, as at 66, since the locking lobe portions preferably have a small fillet radius which is formed during the extruding operation. Thus, the sections 62 and 64 of the thread 48 between the locking lobe portions 50 and 52 retain substantially the original pitch diameter and are substantially undistorted, and the sections 62 and 64 of the thread 48 preferably have a clearance fit in the internally threaded aperture 30 of the rocker arm.

Referring to Figs. 6–10, a tool, generally designated 68, is illustrated which may be utilized to form the locking lobe portions 50 and 52 on the body portion 32 of the screw. The tool 68 includes a shank portion 70, a neck portion 72 and a head portion 74, the shank portion 70 being adapted to be inserted in the tool holding member of a driving machine (not illustrated), while the head portion 74 and the adjacent section 75 of the neck portion 72 are adapted to be driven into the bore 38 of the screw. As shown in Figs. 9 and 10, the head portion 74 of the tool 68 includes curved surfaces, 76 and 78, the center of curvature of which coincides with the longitudinal axis of the bore 38 and the radius of curvature of which is preferably substantially the same or slightly less than the radius of curvature of the enlarged portion 44 of the bore 38 of the screw. The radius of curvature of the surfaces 76 and 78 is greater than the radius of curvature of the bore 38 of the screw. The head portion 74 and the adjacent sections 75 of the neck portion 72 are also provided with flat substantially parallel side walls 80 and 82, the perpendicular distance between the side walls 80 and 82 being substantially less than the minimum transverse dimension of the bore 38. In the embodiment of the invention illustrated, carbide inserts 84 and 86 are brazed to the head portion of the tool. The inserts 84 and 86 provide the curved surfaces 76 and 78, and serve to prolong the life of the tool.

In extruding the locking lobe portions 50 and 52 through the wall 55 of the body portion 32 of the screw, the head portion 74 and the adjacent section 75 of the neck portion 72 of the tool are forced into the bore 38 of the screw so as to extrude diametrically opposed sections of the wall of the body portion of the screw radially outwardly for substantially the entire length of the body portion. As previously mentioned, it is preferred that the locking lobe portions 50 and 52 terminate in spaced relationship with respect to the ball-end portion 34 so that several convolutions of the thread 48 at the leading end of the screw retain the initial pitch diameter to facilitate the starting engagement with a complementary internal thread in the rocker arm, tappet body, push rod or the like. Since the maximum transverse dimension of the head portion 74 and the adjacent section 75 of the neck portion 72 of the tool 68 is substantially the same or less than the diameter of the enlarged portion 44 of the bore, the wall of the head portion 36 of the screw is not affected by the tool and the head portion retains its original configuration when the tool is driven into the bore 38 of the screw.

The enlarged head portion 36 of the screw and the closed ball-end portion 34 of the screw co-operate to support and maintain the rigidity of the wall 55 of the body portion 32 during the lobe-forming operation so that the metal is extruded or displaced rather than merely deformed, and the portions 58 and 60 of the wall intermediate the lobe portions 50 and 52 remain substantially undistorted. The diameter of the bore 38 is preferably initially proportioned to the outside diameter of the screw so that the wall 55 of the body portion 32 remains relatively stiff when the bore 38 is formed in the screw. In the embodiment of the invention illustrated, the diameter of the bore 38 is approximately one-half the outside diameter of the body portion.

The prevailing torque may be predetermined and may be varied by varying the ratio of the outside diameter of the screw body portion to the diameter of the bore 38 so as to vary the flexibility of the wall 55 of the body portion. For example, if the screw is to be used with a mating internally threaded member having a relatively loose tolerance, the diameter of the bore 38 of the screw may be increased slightly to increase the flexibility and the spring effect of the wall 55. If the screw is to be used with mating threads of aircraft tolerances, the diameter of the bore 38 may be reduced slightly to reduce the flexibility and the spring effect of the wall 55.

Since the tool 68 enters and is forced into the screw axially of the bore 38, and since the wall 55 of the body portion is parallel to the longitudinal axis of the screw, the locking lobe portions 50 and 52 project uniformly radially outwardly and also extend longitudinally of the body portion of the screw for a distance substantially coincident with the distance which the head 74 of the tool penetrates within the bore. This results in a uniform displacement of the thread on the locking lobe portions while the several convolutions at the leading end of the thread retain the initial pitch diameter.

Each of the locking lobe portions 50 and 52 may subtend an angle ranging between five and one hundred fifty degrees, and preferably subtend an angle in the range from fifteen to ninety degrees. In the embodiment of the invention illustrated, each of the locking lobe portions subtends an angle of approximately thirty degrees. With such a construction, a substantial area contact is effected between the sections of the thread on the locking lobe portions and the mating internal threads and such area contact also extends for substantially the entire length of the internal threads when the screw projects through the bore of the rocker arm. The uniform displacement of the threads on the locking lobe portions insures a uniform prevailing torque throughout the range of adjustment of the screw, and a definite and positive prevailing torque is obtained throughout this range.

After the locking lobe portions 50 and 52 have been formed on the screw, the screw is preferably hardened to spring temper, as by carburizing, and the ball-end portion 34 is preferably selectively induction hardened, preferably to a minimum hardness corresponding to 58 on the Rockwell C Scale.

In the installation of the screw 20 in the rocker arm 22, the screw may be readily started into the internally threaded aperture 30 in the rocker arm since the entering convolutions of the thread 48 have a free fit. As the locking lobe portions 50 and 52 enter the aperture 30, an interference fit is effected and the locking lobe portions 50 and 52 are subjected to compression forces which causes the lobe portions to yield elastically and resiliently radially inwardly. The dimensional amount of elastic compression to which the lobe portions 50 and 52 are subjected is absorbed by the thread clearance portions 58 and 60 disposed between the locking lobe portions. The result is a lasting or enduring lock between the segments of the thread flanks on the locking lobe portions and the thread flanks of the internal thread in the rocker arm. Consequently, the screw is self-locking and a prevailing torque is obtained in any position of adjustment in the internally threaded aperture in the rocker arm.

The desired valve lash adjustment may be readily made by merely applying a wrench to the head portion 36 of the screw, thus leaving the mechanic's other hand free to check the clearance with a feeler gauge or other inspection tool.

Another embodiment of the invention is illustrated in Fig. 11. In this embodiment of the invention, a screw, generally designated 220, is provided which is particularly adapted for use in a tappet body 222 having an internally threaded bore 230 therein. The screw 220 includes a body portion 232, a head portion 236 and a bearing portion 234 at the upper end thereof, as viewed in Fig. 11, the bearing portion 234 being adapted to engage a rocker arm or other valve actuating mechanism. The body portion 232 defines an axially extending bore 238 which is closed at the end thereof adjacent the head portion 236 and which extends from the end 240 of the screw to a position adjacent the head portion 236 thereof. The bore 238 is enlarged, as at 244, from the end 240 of the screw to a position such that the leading convolutions of the thread are not affected when the locking lobe portions are formed on the screw body. The external thread 48 and locking lobe portions 50 and 52 are provided on the body portion 232 in the manner previously described and the screw 220 functions in substantially the same manner as the screw 20 illustrated in Figs. 1-5, when the screw is inserted in the internally threaded aperture 230 defined by the tappet body 222.

Another embodiment of the invention is illustrated in Figs. 12 and 13. This embodiment of the invention includes a screw 320 which is generally similar to the screw illustrated in Fig. 11 with the exception that a socket 335 is formed in a bearing portion 334 for receiving a ball-end portion 337 of a push rod 339, as shown in Fig. 12, or the ball-end 341 of a stud 343 carried by a rocker arm 322, as shown in Fig. 13. The screw 320 may be introduced into the internally threaded bore 30 of the rocker arm 22 from beneath, as shown in Fig. 12, or the screw 320 may be inserted in the internally threaded bore of a tappet body, as shown in Fig. 13. The screw 320 functions in substantially the same manner as the screw illustrated in Figs. 1-5 and described hereinabove in detail.

In Fig. 14, a screw 420 is illustrated which is of the type shown in Figs. 13 and 14, with the exception that a ball-end portion 434 is formed on the bearing portion instead of a socket, the ball-end portion 434 being adapted to seat in a socket 437 provided on the upper end of a push rod 439.

It will be appreciated that the embodiments of the invention illustrated in Figs. 11 through 14 all include a wrench-receiving head portion and a bearing portion at the same end of the screw rather than at opposite ends thereof as in the embodiment of the invention illustrated in Figs. 1-5. These modifications are all variations of the basic concept and depict the manner in which the screw body may be employed for use with tappets and push rods as well as with rocker arms.

While preferred embodiments of the invention have been shown and described, it will be understood that various changes and modifications may be made without departing from the spirit of the invention.

What is claimed is:
1. A self-locking prevailing torque-type screw adapted for adjustable mounting in a mating member having an aperture provided with an internal thread of uniform pitch diameter, said screw comprising a substantially cylindrical, elongated, resilient body portion hardened to spring temper, a solid bearing portion of substantial area integral with the leading end of said body portion, and an enlarged, non-circular, wrench-engageable head portion integral with the trailing end of said body portion, said body portion and said head portion defining a bore extending through said head portion and into said body portion and terminating in spaced relationship with respect to said bearing portion with the diameter of the bore in said head portion being greater than the diameter of the bore in said body portion, an uninterrupted external thread on said body portion, the length of said external thread on said body portion being at least twice the external diameter of said body portion whereby said screw may be adjusted longitudinally relative to said mating member, portions of the wall of said body portion intermediate said bearing portion and said head portion projecting abruptly radially outwardly in a plurality of angularly spaced zones to form a plurality of angularly spaced locking lobes extending for the major portion of the length of said external thread, the pitch line of the portions of said external thread on said locking lobes lying on a cylinder concentric with the screw axis and of a diameter greater than the diameter of the pitch line of the remaining portions of the thread and the diameter of the pitch line of the mating internal thread, said head portion and said remaining portions of said external thread being substantially undistorted.

2. The invention as set forth in claim 1 wherein at least one entire convolution of said external thread at the leading end thereof is substantially undistorted and adapted to mate freely with the external thread of said member, and wherein said bearing portion is of greater hardness than said body portion.

References Cited in the file of this patent
UNITED STATES PATENTS

| | | |
|---|---|---|
| 987,142 | Kenney | Mar. 21, 1911 |
| 2,202,928 | Shaw | June 4, 1940 |
| 2,407,160 | Kahn | Sept. 3, 1946 |
| 2,637,361 | Nagel | May 5, 1953 |
| 2,754,871 | Stoll | July 17, 1956 |